(12) United States Patent
Uchida et al.

(10) Patent No.: US 6,553,309 B2
(45) Date of Patent: Apr. 22, 2003

(54) NAVIGATION SYSTEM

(75) Inventors: Toshiharu Uchida, Tsurugashima (JP); Keiichi Yamauchi, Tsurugashima (JP); Koichi Nagaki, Tsurugashima (JP); Michihiro Kaneko, Tsurugashima (JP); Atsuo Ohmori, Tsurugashima (JP)

(73) Assignee: Pioneer Corporation, Tokyo-to (JP)

( * ) Notice: Subject to any disclaimer, the term of this patent is extended or adjusted under 35 U.S.C. 154(b) by 0 days.

(21) Appl. No.: 09/774,665

(22) Filed: Feb. 1, 2001

(65) Prior Publication Data

US 2001/0012980 A1 Aug. 9, 2001

(30) Foreign Application Priority Data

Feb. 3, 2000 (JP) ........................................ 2000-032696

(51) Int. Cl.[7] ................................................ H04M 3/42
(52) U.S. Cl. ........................ 701/208; 701/200; 701/211; 455/414; 455/418; 455/456
(58) Field of Search .................................. 701/200, 207, 701/208, 209, 210, 211, 213; 340/998, 990, 995; 73/198 R; 345/133, 419, 427, 438, 510; 455/414, 418, 456

(56) References Cited

U.S. PATENT DOCUMENTS

| | | | |
|---|---|---|---|
| 5,887,269 A | | 3/1999 | Brunts et al. ................ 701/208 |
| 6,098,015 A | * | 8/2000 | Nimura et al. .............. 701/209 |
| 6,349,203 B1 | * | 2/2002 | Asaoka et al. .............. 455/414 |

\* cited by examiner

Primary Examiner—Thomas G. Black
Assistant Examiner—Arthur D. Donnelly
(74) Attorney, Agent, or Firm—Nixon & Vanderhye P.C.

(57) ABSTRACT

A navigation system is provided with: a present position detecting device (16, 17, 18) for detecting a present position; and a navigation device (11, 20, 21, 22, 23, 24) for performing a navigation in correspondence with the detected present position on the basis of map data. The navigation system is also provided with a menu controlling device (11, 25, 26) for controlling a menu display of the navigation by using menu information capable of being updated.

24 Claims, 8 Drawing Sheets

NAVIGATION SYSTEM

BACKGROUND OF THE INVENTION

1. Field of the Invention

The present invention relates to a navigation system for carrying out a navigation operation by using map data, and more particularly relates to a navigation system which the user can operate in accordance with a menu display having various functions of the navigation.

2. Description of the Related Art

There is a navigation system, which performs a navigation for a car by using map data. In such a navigation system, there are prepared a plenty of functions in relation to the navigation. Thus, a menu screen is displayed so that the user can easily select one of the functions. This kind of menu screen has a hierarchy data structure, which includes an initial main menu screen for displaying main functions, and a sub menu screen for displaying additional functions of the main functions. The user operates the navigation system to select the function desired to be executed while watching this kind of menu screen, so that a comfortable navigation can be executed.

In the above described navigation system, the data structure of the menu screen is set in advance in accordance with the usage frequencies etc., of the respective functions. For example, a function expected to be frequently used is displayed as one of the selectable items on the main menu, so that the user can select it.

However, the usage manner of each function on the navigation cannot be uniquely determined, but is variable depending upon the actual usage condition of the navigation, the taste of the user or the like. Thus, the given menu screen, which is set in advance, may not be convenient for the user or may not be in line with the usage manner of the user.

SUMMARY OF THE INVENTION

The present invention is proposed in view of the above mentioned problems. It is therefore an object of the present invention to provide a navigation system, which can update a menu screen for the navigation and can perform a navigation while displaying a menu screen suitable for a usage manner or condition of a user.

The above object of the present invention can be achieved by a first navigation system provided with: a present position detecting device for detecting a present position; a navigation device for performing a navigation in correspondence with the detected present position on the basis of map data; and a menu controlling device for controlling a menu display of the navigation by using menu information capable of being updated.

According to the first navigation system of the present invention, a menu using the menu information is displayed at the time of the navigation operation of the navigation system. When the user wants to update the menu information, the user can customize the menu information by using the menu information which is constructed by himself or herself fro example. Therefore, it is possible to perform the menu display suitable for the user's usage condition or manner of the navigation, and it is possible to realize the navigation superior in the operability.

In one aspect of the first navigation system of the present invention, the menu controlling device controls the menu display of the navigation by using another menu information set and fixed in advance, in addition to the menu information capable of being updated.

According to this aspect, at the time of the navigation operation, the menu display using the fixed menu information in addition to the menu information capable of being updated is performed. Thus, since the default menu information can be used, it is possible to display a simple menu display, which does not require any troublesome task for customizing, if it is not necessary to customize the menu display of the navigation.

In this aspect, the navigation system may be further provided with a menu selection device adapted to select one of the menu information, which is set and fixed in advance, and the menu information capable of being updated, as the menu information to be used for the menu display.

By constructing in this manner, it is possible to selectively perform the menu display of either the menu information capable of being updated or the fixed menu information, by virtue of the menu selection device, at the time of the navigation operation. Thus, the user can utilize the default menu information and the customized menu information by flexibly switching those to each other, so that the operability and convenience of the navigation can be even more improved.

Further in this case, the menu selection device may be adapted to select one of a plurality of menu information each capable of being updated, as the menu information to be used for the menu display.

By constructing in this manner, since there are prepared a plurality of menu information capable of being updated in the menu display, it is possible to selectively menu-display one of them by virtue of the menu selection device. Thus, the user can use the menu information optimum for the usage condition of the navigation, so that the operability and convenience of the navigation can be even more improved.

In another aspect of the first navigation system of the present invention, the navigation system is further provided with a reading device, to which an external record medium recorded with the menu information capable of being updated is set, for reading the menu information from the external record medium.

According to this aspect, at the time of navigation operation, the menu information recorded in the external record medium is read out, and the menu display is performed on the basis of the read out menu information. Thus, it is possible to expand the usage possibility of the menu information e.g., using the menu information constructed by the user's personal computer.

In another aspect of the first navigation system of the present invention, the navigation system is further provided with a wireless communication device for receiving the menu information capable of being updated from an external portion.

According to this aspect, at the time of the navigation operation, the menu information is received from the external portion by the wireless communication device such as a portable telephone, and the menu display is performed on the basis of the received menu information. Thus, the navigation system is quite suitable for the usage in a movable body, and it is possible to expand the usage possibility of the menu information.

In this aspect, the menu information capable of being updated may be reserved on an internet, and the wireless communication device receives the menu information capable of being updated by connecting to the internet.

By constructing in this manner, at the time of the navigation operation, the internet connection is achieved by the wireless communication device, and the menu information capable of being updated is downloaded to thereby perform the menu display on the basis of the downloaded menu information. Thus, by preparing a plurality of menu information in advance on the internet, the user can easily obtain the various menu information.

In another aspect of the first navigation system of the present invention, the navigation system is further provided with an operation device adapted to issue an operation command of the navigation in accordance with the menu display.

According to this aspect, when the menu for the navigation is displayed, by issuing the operation command by the operation device, it is possible to perform the function corresponding to the menu display. Thus, it is possible for the user to confirm the desirable function of the navigation on the menu display, and speedily perform it.

In this aspect, the navigation system may be further provided with an operation history memory for storing an operation history of the operation device, and the menu controlling device may control the menu display on the basis of the operation history.

By constructing in this manner, at the time of the navigation operation, the operation history of the operation command issued by the operation device is reserved, and then the menu display is controlled on the basis of this operation history. Thus, the menu display can be controlled with reflecting the user's usage tendency of the navigation, and thereby the navigation adaptable for various users and superior in the operability can be realized.

Further in this case, the menu information may have such a data structure that the operation command is assigned to respective one of a plurality of hierarchies of the menu display, and the menu controlling device may change an hierarchy of the operation command on the basis of the operation history.

By constructing in this manner, in the menu display at the time of the navigation operation, the operation commands from a higher hierarchy to a lower hierarchy are constructed in a hierarchy manner, and the hierarchy of the operation commands is changed on the basis of the operation history. Thus, it is possible to control the hierarchy structure of the menu display with reflecting the tendency of the past operation commands, so that the navigation which is fine and superior in the operability can be realized.

Furthermore in this case, the menu controlling device may judge the number of times of operations for each operation command on the basis of the operation history, may change the operation command for which the number of times of the operation is larger to a higher hierarchy and may change the operation command for which the number of times of the operation is smaller to a lower hierarchy.

By constructing in this manner, in the menu display at the time of the navigation operation, the number of times of the operation at the time when the operation command is issued is judged, and the operation command whose number of times of the operation is the larger is changed to the higher hierarchy of the menu display, while the operation command whose number of times of the operation is the smaller is changed to the lower hierarchy of the menu display. Thus, as the usage frequency of one operation command is the higher, this operation command can be more easily performed, so that the operability of the navigation can be certainly improved.

Furthermore in this case, the menu controlling device may set a display character string accompanying the menu display with respect to each operation command, and may change the display character string when changing the operation command to the higher or lower hierarchy.

By constructing in this manner, the display character string is set for each operation command in accompaniment with the menu display of the navigation. Then, the operation command whose number of times of the operation is the larger is changed to the higher or lower hierarchy and at the same time, the display character string thereof is displayed. Therefore, it is possible for the user to grasp the content of the operation command appropriately in correspondence with the hierarchy thereof and to even more easily select the operation command.

In another aspect of the first navigation system of the present invention, the menu information is described by a format corresponding to a hyper text.

According to this aspect, at the time of the navigation, the menu information used for the menu display is corresponding to the hyper text. Thus, it is possible to easily customize the menu display especially in the menu display using both of a main menu and a large number of sub menus, so that the operability of the navigation can be even more improved.

The above object of the present invention can be also achieved by a second navigation system provided with: a present position detecting device for detecting a present position; a navigation device for performing a navigation in correspondence with the detected present position on the basis of map data; a menu information memory for storing a plurality of menu information corresponding to a plurality of different menus; a menu selection device adapted to select a desirable menu information from among the plurality of menu information; and a menu controlling device for controlling a menu display of the navigation by using the selected desirable menu information.

According to the second navigation system of the present invention, there are prepared a plurality of menu information in the navigation system, and the user's favorable menu information among them can be selectively menu-displayed by virtue of the menu selection device. Thus, the user can use the menu information optimum for the user's usage condition of the navigation, so that the operability of the navigation can be even more improved.

In one aspect of the second navigation system of the present invention, the menu selection device displays a menu selection screen including titles of the plurality of menu information stored in the menu information memory.

According to this aspect, since the title of each menu is displayed on the menu selection screen, it is easy for the user to perform the menu selection.

In another aspect of the second navigation system of the present invention, the plurality of menu information include menu information capable of being updated.

According to this aspect, when the user wants to update the menu information, it is possible to customize the menu display by using, the menu information constructed by himself or herself. Thus, it is possible to perform the menu display suitable for the user's usage condition of the navigation, and it is possible to realize the navigation superior in the operability.

In this aspect, a layout of a menu in the menu information capable of being updated may be capable of being updated.

By constructing in this manner, since the layout in the menu can be changed at the time of updating the menu information, it is possible to perform the menu display in a layout, which can be easily used by the user.

Alternatively in this aspect, a character string of a menu in the menu information capable of being updated may be capable of being updated.

By constructing in this manner, since the character string displayed in the menu can be changed at the time of updating the menu information, it is possible to perform the menu display in a message, which can be easily understood by the user.

In another aspect of the second navigation system of the present invention, the plurality of menu information include menu information corresponding to a menu whose theme is a specific event.

According to this aspect, since the menu information, whose theme is a specific event such as an exhibition, a fair, a country festival or the like, is used at the time of the menu display of the navigation, it is possible for the user to obtain a beneficial information when going to a venue of the event.

In this aspect, the menu whose theme is the specific event may include an item related to a facility of an event place.

By constructing in this manner, at the time of the menu display of the navigation, it is possible to display the usage condition of a facility within or in the vicinity of the venue of the event (e.g., a car park, a restaurant or the like), so that the user can obtain the beneficial information by a simple menu operation.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Preferred embodiments of the present invention will be explained below with reference to the drawings.

Figure 1:
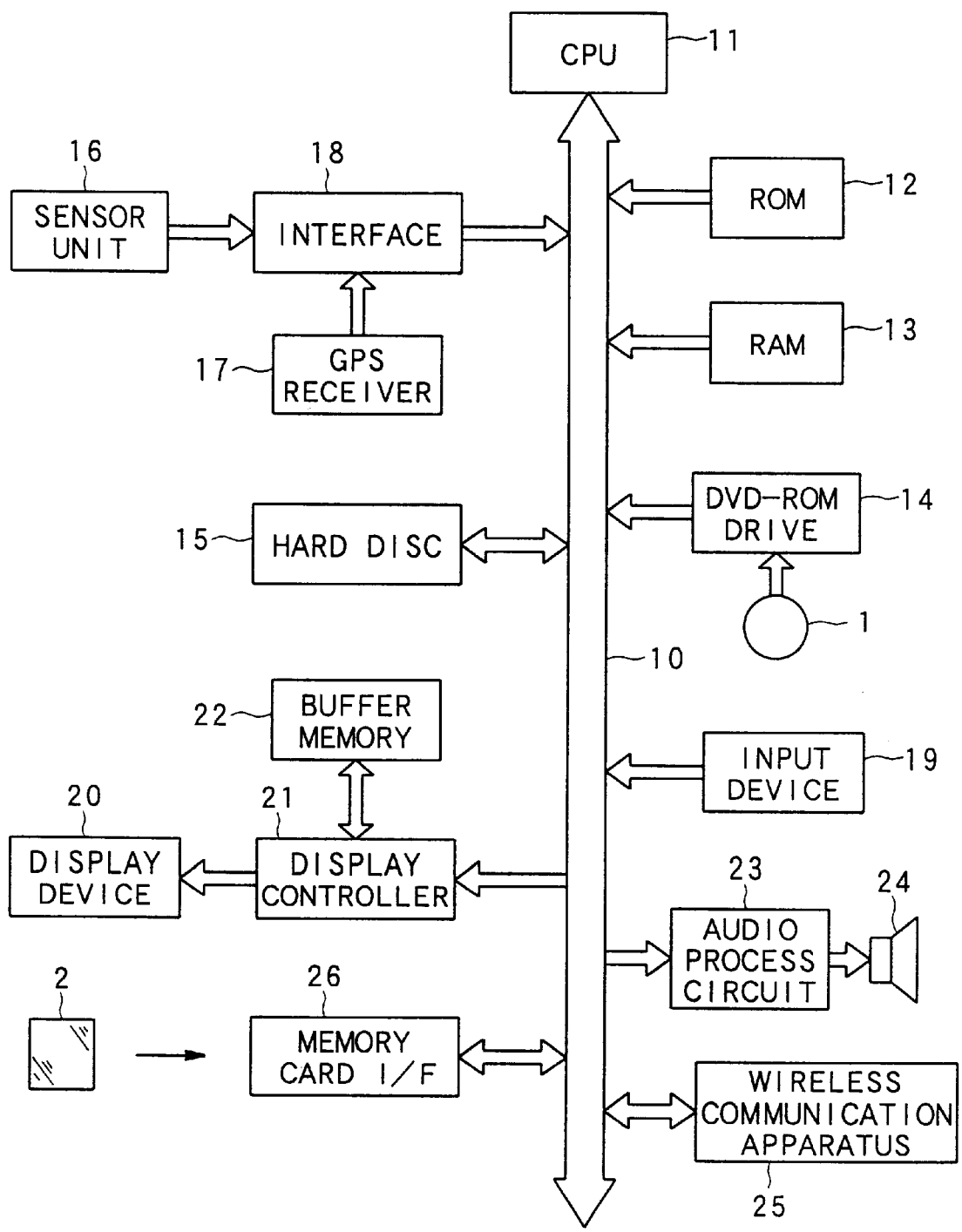
FIG. 1 is a block diagram showing an entire configuration of a navigation system as an embodiment of the present invention.

FIG. 1 is a block diagram showing the entire configuration of a navigation system as the embodiment. The navigation system shown in FIG. 1 is provided with a CPU 11, a ROM 12, a RAM 13, a DVD-ROM drive 14, a hard disc 15, a sensor unit 16, a GPS receiver 17, an interface 18, an input device 19, a display device 20, a display controller 21, a buffer memory 22, an audio process circuit 23, a speaker 24, a wireless communication device 25 and a memory card interface 26.

In FIG. 1, the CPU 11 controls the entire operation of the navigation system. The CPU 11 is connected through an inner bus 10 to the respective constitutional elements of the navigation system. The CPU 11 reads a control program stored in the ROM 12 through the inner bus 10. The CPU 11 carries out the control program while transiently storing data, which is currently being processed, into the RAM 13. The CPU 11 functions as one example of a menu controlling device as well as a menu selecting device of the present invention.

The DVD-ROM drive 14 contains a DVD-ROM 1 for storing the map data, and carries out an operation of reading the map data. The DVD-ROM 1 is a record medium having a large storage capacity, such as 4.7 Gigabytes in case of the one-surface one layer type and 8.5 Gigabytes in case of the one-surface two-layer type. Pits corresponding to the record data are formed on the DVD-ROM 1. The record data is read by using an optical pickup of the DVD-ROM drive 14.

The DVD-ROM 1 stores therein the map data including road situation data necessary for a navigation operation. Moreover, various related data, such as related facility data, name data and the like are stored while they are correlated with the road situation data. In this embodiment, the entire map is divided into blocks, as meshed unit areas. The map data corresponding to each block is managed as each "block map data". A plurality of block map data are recorded in the DVD-ROM 1.

In the DVD-ROM 1, map data including road shape data necessary for the navigation operation are stored, and various relation data such as facility data, name data or the like related to the map data are also stored in correlation with the road shape data. For example, the whole map is divided into blocks as unit areas in a mesh like manner, and a map file is assigned to each block, so that the whole map data comprising a large number of map files are stored in the DVD-ROM 1.

The hard disc 15 is a non-volatile type memory for reading and writing the various data such as the map data and the like. The hard disc 15 can be used for many purposes, and can store therein the various data such as music data, video data, an application program and the like.

In the hard disc 15, there may be prepared an area where the menu information required for the menu display for the navigation is reserved. The menu information may include various menu data required for the menu display, operation history data at the time of the menu operations. As the kinds or categories of the menu data, there are two kinds i.e., (i) default menu data set in advance as described later, and (ii) user menu data, which can be freely composed and used by the user. The menu data will be described later in detail.

The sensor unit 16 is provided with various sensors required to detect a self-car position. Actually, it contains a car speed sensor, a travel distance sensor and an azimuth sensor to detect a travel situation of the car and the like.

The GPS receiver 17 receives an electric wave from a GPS (Global Positioning System) satellite, and outputs measurement data. The sensor unit 16 and the GPS receiver 17 function as one example of a self-car position detector, in cooperation with the CPU 11.

The interface 18 carries out an interface operation between (i) the sensor unit 16 and the GPS receiver 17 and (ii) the CPU 11. The CPU 11 obtains the self-car position data, on the basis of the measurement data from the GPS receiver 17 and sensor outputs from the sensor unit 16. This self-car position data is correlated with the above-mentioned map data by the CPU 11, and is corrected by using a map matching process and the like.

The input device 19 is constructed as various keys or various buttons to perform desirable operations respectively in the navigation operation are arranged. The input device 19 is disposed on a main body of the navigation system or an external remote controller. When one of those various keys or buttons is pressed, a detection signal corresponding to the pressed key or button is sent to the CPU 11. The input device 19 functions as one example of an operation device of the present invention, through which the user can select the function in front of the menu display for the navigation operation. Incidentally, the input device 19 may be composed of a touch panel attached on the display device 20.

The display device 20 is used for the navigation operation, and it is composed of, for example, a CRT, a liquid crystal display or the like. The map data is displayed on the display device 20, in various manners under a control of the display controller 21. The self-car position is displayed as a car mark overlapping with the map data. Further, a predetermined menu display screen is displayed on the display device 20 when the above mentioned menu display is performed at the time of the navigation.

The display controller 21 generates the display data to be displayed on the display device 20. While transiently storing the display data into the buffer memory 22, the display controller 21 reads the display data from the buffer memory 22 at a proper timing, and outputs and displays it on the display device 20.

The audio process circuit 23 generates a predetermined audio signal under the control of the CPU 11. The audio signal amplified to a proper level by the audio process circuit 23 is outputted as a sound from the speaker 24 to an external portion. As such an audio signal, for example, there is a guidance voice to guide a route for the car.

The wireless communication device 25 transmits and receives various data required for the navigation by means of a wireless communication. As the wireless communication device 25, a wireless communication unit may be built-in, or an interface to which an external portable telephone is connected may be equipped.

The memory card interface 26 performs an interface operation with respect to a memory card 2, in which various data required for the navigation is recorded, and functions as a reading device for reading data recorded in the memory card 2. In the present embodiment, the user can utilize the memory card 2 in order to record the user menu data or the like into it. By inserting the memory card 2 into a card slot (not illustrated) of the memory card interface 26, it is possible to input and output the required data between the memory card 2 and the CPU 11.

Figure 2:
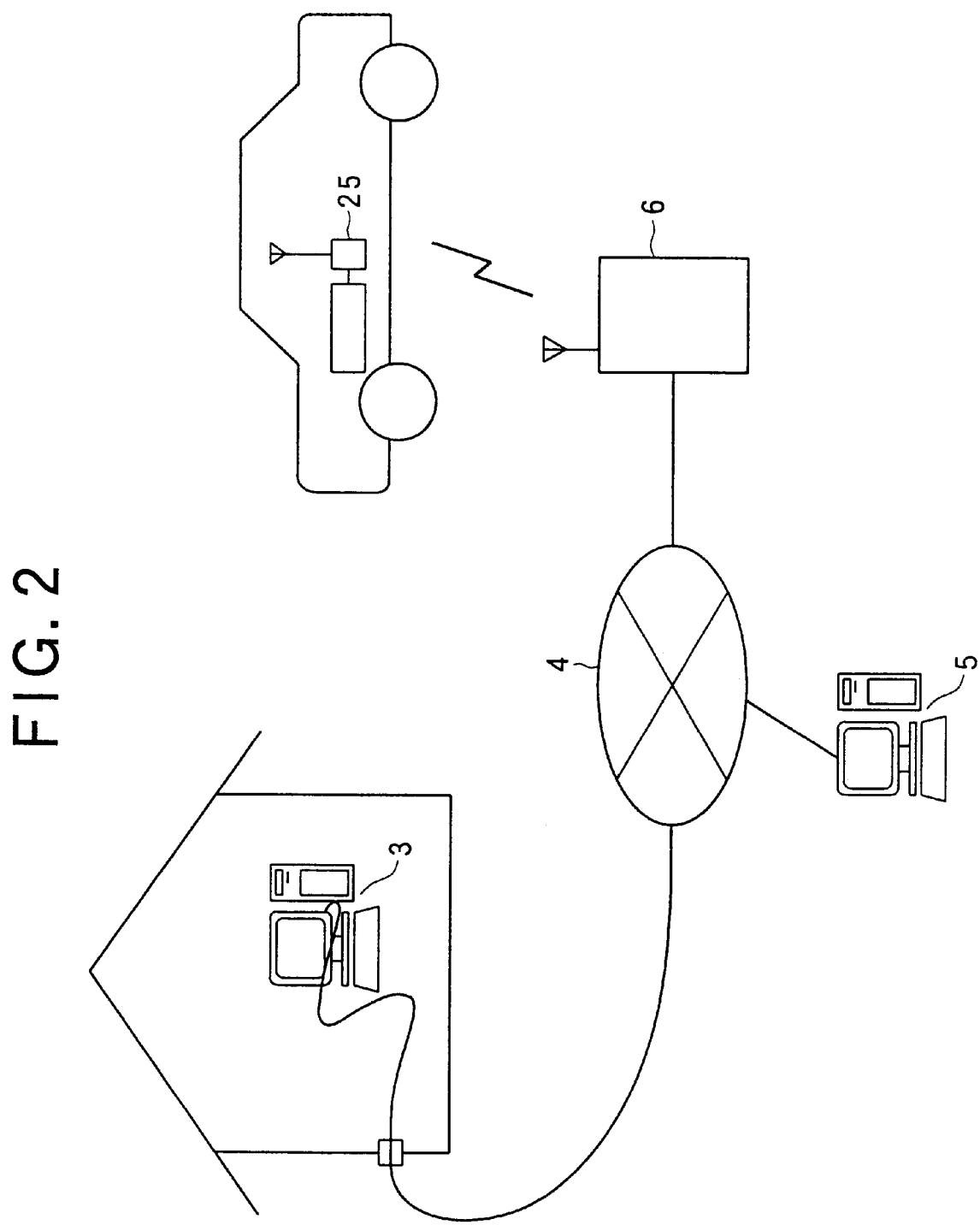
FIG. 2 is a schematic diagram showing a usage manner in case of performing a menu process in the navigation system of the embodiment.

Next, the usage manner in case of performing the menu process of the navigation system for a car is explained with reference to FIG. 2. In FIG. 2, both of (i) a first usage manner that the menu process is performed by inserting the memory card 2 in which the required menu data is recorded into the memory card interface 26, and (ii) a second usage manner that the menu process is performed by obtaining the menu data through a wireless communication served in advance on the internet and then using it, are shown.

In FIG. 2, the first usage manner is to record the user menu data, which the user constructs, into the memory card 2. Namely, the user constructs his or her desirable user menu data by using a predetermined application soft ware at a user terminal 3, and stores it into the memory card 2. When this memory card 2 is set into the memory card interface 26 of the car, the later described menu process can be performed as the user menu data recorded in the memory card 2 is read out during the execution of the navigation, after that.

In FIG. 2, the second usage manner is such that a large number of available user menu data are prepared in advance at a center terminal 5 on the internet 4. In the navigation system, the wireless communication is performed between the wireless communication device 25 and a wireless station 6 connected to the internet 4, and the desirable user menu can be obtained from the center terminal 5. The user menu data once obtained from the center terminal 5 can be read as the occasion demands in the car, by storing it in the hard disc 15 for example, during the execution of the navigation.

Next, the menu process in the navigation operation will be explained with reference to FIG. 3 to FIG. 11. Hereinbelow, although a case is explained in which the navigation is executed by using the memory card 2 in which the menu information is recorded is explained, it is possible to apply the present embodiment to a case in which the menu information is obtained through the wireless communication device 25 or the menu information is recorded in the hard disc 15 in advance.

Figure 3:
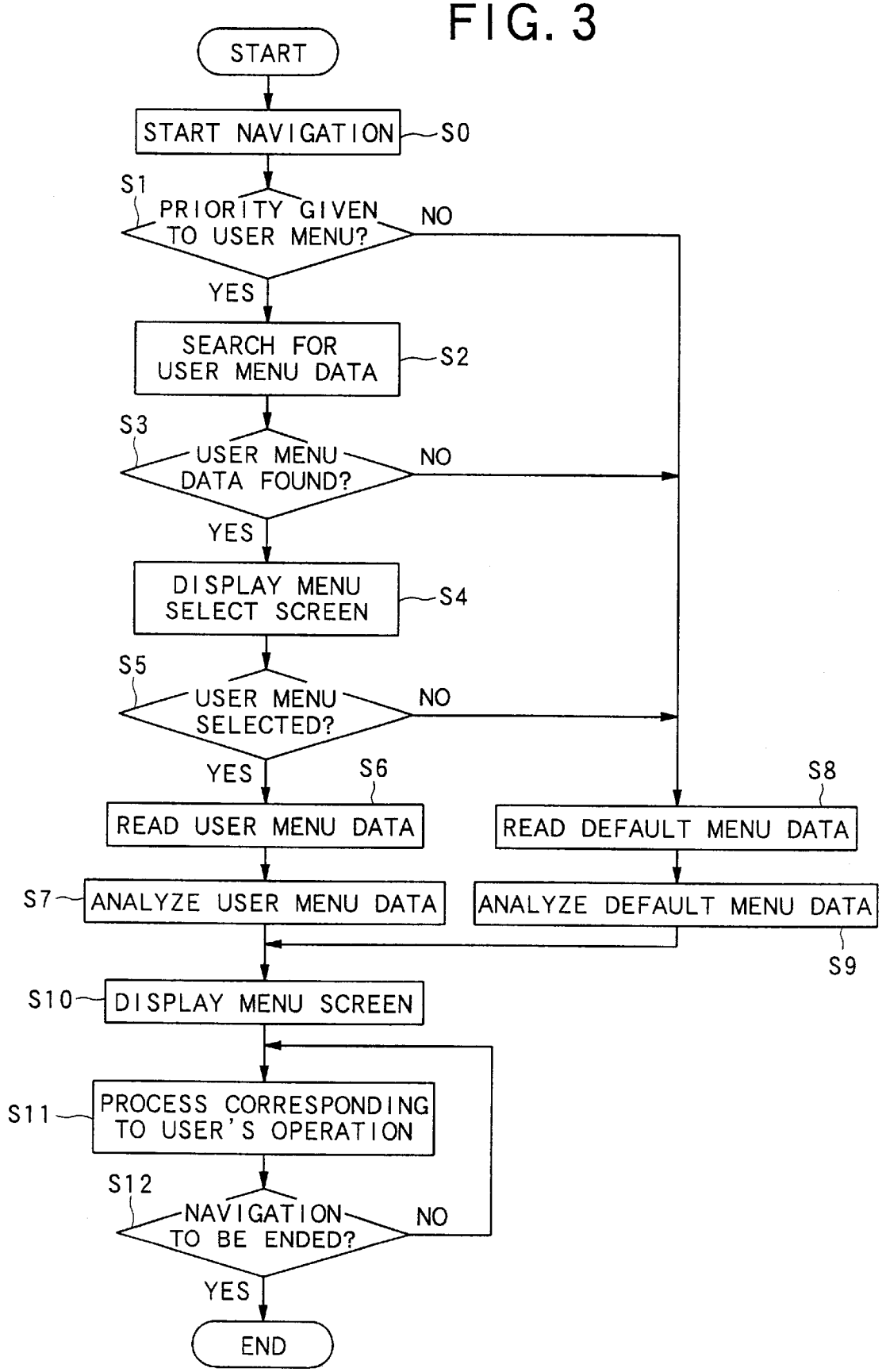
FIG. 3 is a flowchart showing a menu process at the time of starting a navigation in the embodiment.

FIG. 3 is a flow chart showing a menu process at the time of starting the navigation in the present embodiment. As shown in FIG. 3, it is assumed that the navigation is started by a predetermined operation as an initial condition (step S0). At this time, it is also assumed that the memory card 2 in which the desirable user menu data is recorded is inserted in the card slot of the memory card interface 26.

At first, it is judged whether or not the setting is to give the priority to the user menu (step S1). Namely, in the navigation system of the present embodiment, the setting is to give the priority to either one of the default menu and the user menu as the menu display, in accordance with the user operation. As a result of the judgment at the step S1, if the setting is to give the priority to the user menu (step S1: YES), the operational flow proceeds to a step S2. If the setting is not to give the priority to the user menu (step S1: NO), the operational flow proceeds to a step S8 so as to read the default menu data (step S8).

At the step S2, the memory card 2 is accessed through the memory card interface 26, so as to search for the user menu data, from among the menu information (step S2). For example, the user menu data is distinguished by giving a predetermined additional code to each file name, with respect to the file corresponding to the user menu data. In the present embodiment, since it is possible for the user to construct the desirable user menu data in advance and reserve it in the memory card 2, the presence or absence of the user menu data is checked by searching the memory card 2 inserted in the card slot at the step S2.

Then, it is judged whether or not the user menu data is found on the basis of the searching result at the step S2 (step S3). As a result, if the user menu data is found (step S3: YES), the operational flow proceeds to a step S4. If the user menu data is not found (step S3: NO), the operational flow proceeds to the step S8.

Then, at the step S4, the menu selection screen at the time of the navigation initial operation is displayed on the display device 20, including the user menu data found at the step S3

(step S4). The user can refer to the menu selection screen, and operates to select his or her desirable menu from among the displayed plurality of menus. As the selectable menus in the present embodiment, there are two kinds of menus i.e., (i) the user menu which can be customized by the user and (ii) the default menu to which a predetermined function is fixed in advance.

Figure 4:
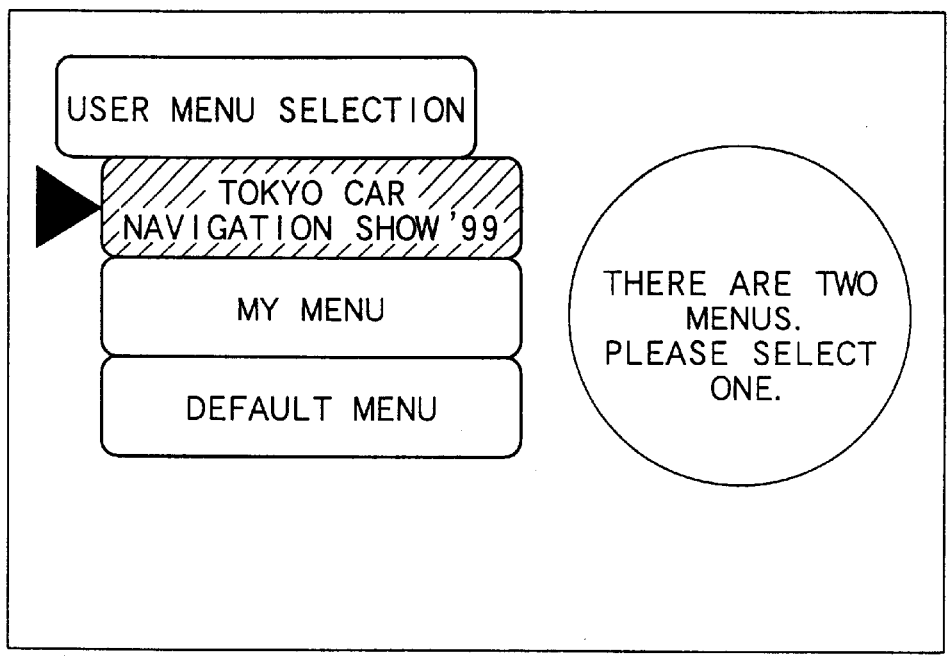
FIG. 4 is a plan view of an example of a menu select screen in the embodiment.

FIG. 4 shows a concrete example of a menu selection screen at the step S4. As shown in FIG. 4, the character string indicating three menus in total i.e., two user menus and one default menu (which are the titles of the menus respectively) are displayed on the left side of the screen, and the character string informing as such is displayed on the right side of the screen. In FIG. 4, such a condition is indicated that the cursor is positioned on the user menu "TOKYO CAR NAVIGATION SHOW '99" among those three menus. In this condition, if a predetermined deciding operation is performed by the input device 19 for example, the display screen is switched to the display screen of the user menu at the lower hierarchy as described later.

In FIG. 4, the user menu "TOKYO CAR NAVIGATION SHOW '99" is a menu, whose theme is a specific event (e.g., fair, festival in a country side or the like), and which can be updated. The user menu "MY MENU" is a menu, which can be updated. The "DEFAULT MENU" is a menu, which is fixed in advance.

Then, at the step S5, it is judged whether the user menu or the default menu is selected from among the menus displayed by the menu selection screen at the step S4. As a result, if the user menu is selected (step S5: YES), the operational flow proceeds to a step S6. If the default menu is selected (step S5: NO), the operational flow proceeds to the step S8.

The steps S6 and S7 are steps in case that the user menu is selected. At the step S6, the memory card 2 is accessed and the predetermined user menu data is read in. This user menu data is transferred through the memory card interface 26 to the RAM 13, and is temporarily stored in the RAM 13. If the user menu data is also stored in the hard disc 15, the user menu data is read from the hard disc 15, and is transferred to the RAM 13.

Then, at the step S7, the user menu data, which has been read in at the step S6, is analyzed so as to generate the display screen for the menu. Here, in the present embodiment, the data format by which each menu data is described is supposed to be the XML (eXtensible Markup Language). The XML is a meta language describing a logical structure of the data by using a description tag which can be individually defined. Thus, in the navigation system, the description tag is defined in advance to each element constituting the menu, so that the user menu data and the default menu data are described in accordance with the description tag. Also, the menu data in the present embodiment has a format corresponding to the hyper text by virtue of the XML, so that it is possible to freely move between the unit data in the different hierarchies.

In the embodiment shown in FIG. 4, three XML files corresponding to the three kinds of menu data exist in the memory card 2, the hard disc 15 or the ROM 12 in the navigation system.

In this manner, at the step S7, the description tag of the XML included in the user menu data is judged, and the analysis to extract the data corresponding to the respective tag is performed. Then, it is possible to construct the display data for the menu on the basis of the result of the analysis at the step S7.

On the other hand, the steps S8 and S9 are steps in case that the default menu is selected. At the step S8, the hard disc 15 is accessed and the default menu data stored therein in advance is read out. Then, at the step S9, the default menu data read at the step S8 is analyzed in the same manner as the step S7, so that the judgment of the description tag corresponding to the XML and the data extraction are performed to thereby construct the display data for menu.

Then, at a step S10 following the step S7 or S9, by moving to the lower hierarchy of the menu selection screen on the basis of the result of the analysis of each menu data, a predetermined menu screen is displayed on the displaying device 20. By this, the user can refer to the menu screen and can execute the necessary function.

Figure 5:
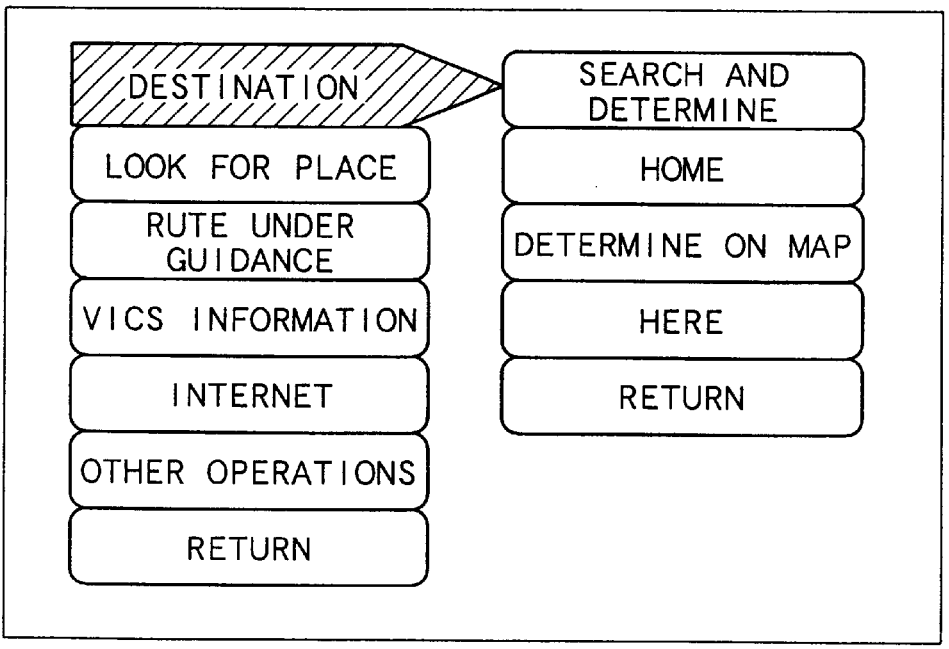
FIG. 5 is a plan view of an example of a menu screen in case that a default menu is selected in the embodiment.
Figure 6:
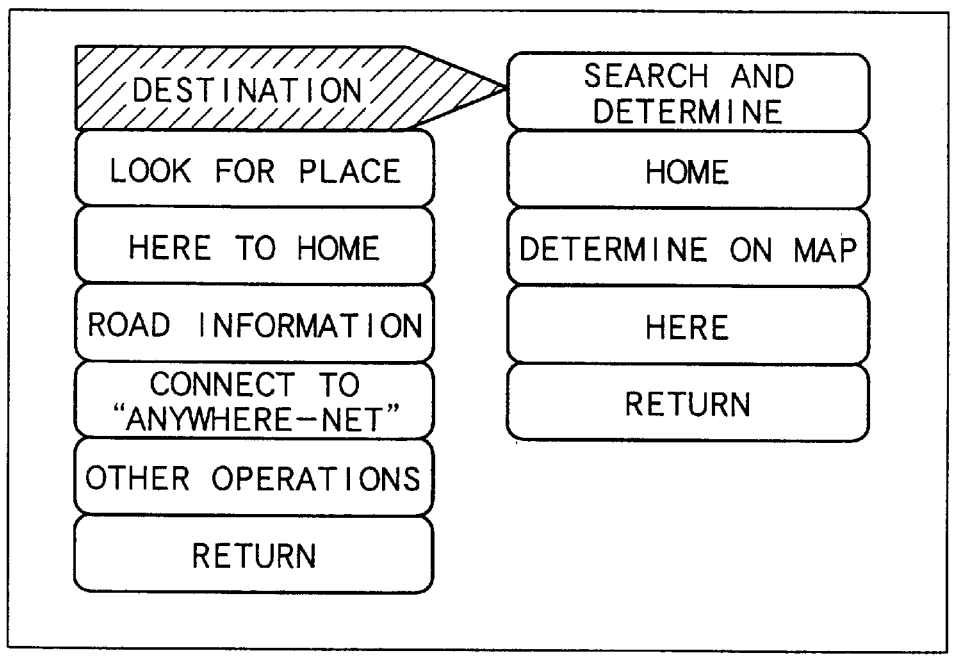
FIG. 6 is an plan view of an example of a first menu screen in case that a user menu is selected in the embodiment.
Figure 7:
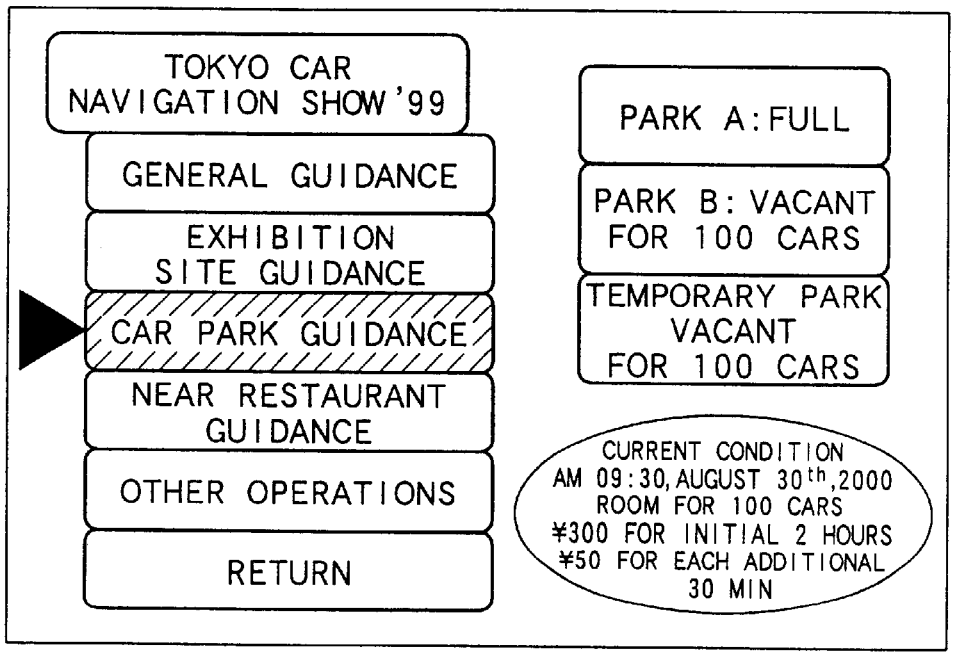
FIG. 7 is a plan view of an example of a second menu screen in case that a user menu is selected in the embodiment.

FIG. 5 to FIG. 7 are concrete examples of the respective menu screens at the step S10. FIG. 5 shows the menu screen in case that the default menu is selected. Each of FIG. 6 and FIG. 7 shows the menu screen in case that the user menu is selected.

In the example of the default menu of FIG. 5, a plurality of operation items, which are to be executed at the time of the navigation, are displayed on the left side of the screen. More concretely, it is possible to select a desirable function from among: "DESTINATION", "LOOK FOR PLACE", "ROUTE UNDER GUIDANCE" and "VICS INFORMATION" as the items related to various functions of the navigation; "INTERNET" to connect to the internet through the wireless communication device 25; "OTHER OPERATIONS" to move to the further lower hierarchy of the menu screen of FIG. 5; and "RETURN" to return to the menu selection screen of FIG. 4. In FIG. 5, the cursor is positioned on the "DESTINATION" among the plurality of items, so that the plurality of operation items in the lower hierarchy thereof are displayed at the right side of the screen.

On the other hand, one portion of the operation item is customized while the default menu of FIG. 5 is used as the base thereof. Namely, in FIG. 6, the character string of "ROUTE UNDER GUIDANCE" is changed to "HERE TO HOME", the character string of "VICS INFORMATION" is changed to "ROAD INFORMATION", the character string of "INTERNET" is changed to "CONNECT TO "ANYWHERE-NET"", in the menu respectively, as compared with FIG. 5. In this manner, the operation items can be customized in line with the user's usage manner of the navigation, and the menu including the optimum operation item or items can be constructed. Thus, it is possible to improve the convenience for the user. The customizing operation of the user menu may be performed as the user directly changes the XML on the edit screen, which is not illustrated or as the XML is automatically changed on the basis of the user's operation history.

In the user menu of FIG. 7, the operation items are customized in correspondence with "TOKYO CAR NAVIGATION SHOW '99" as one example of a specific theme such as an event, a festival or the like. The user menu data, which is customized with using the event etc., as the theme, may be taken in to the navigation system through the internet 4. For example, the menu data (XML file) customized exclusive for various events may be reserved on a server connected to the internet 4, the user may access the server through the internet 4, and the menu data of the event to which the user is attending from now may be down-loaded to the navigation system.

As shown in FIG. 7, various guidance titles related to (i) the facilities in or near the event place such as a restaurant, a car park, or the like and (ii) the event etc., is displayed on the left side of the screen. In FIG. 7, the cursor is positioned on "CAR PARK GUIDANCE" among the plurality of items, and the detailed information related to the car park is displayed on the right side of the screen. If the positional information of the event place or the like (e.g., the longitude and latitude co-ordinations of the event place, the car park or the like) is assembled in the menu data, it is possible to set the even place, the near car park or the like as the destination, on the menu, without newly searching for the destination. By using the menu data which can be updated as the menu data shown in FIG. 7, it is possible to provide the menu of the navigation system flexibly in response to the specific event. By this, the user of the navigation system can easily obtain the menu data corresponding to the event through the internet 4 for example, so that the user can check the route to the event place or the guidance information without performing a troublesome menu operation.

As the detailed information related to the car park in FIG. 7, information which can be obtained from the VICS (Vehicle Information Communication System), the ITS (Intelligent Transport System) or the like in the real time manner, e.g., the degree of traffic jam, the number of cars in the car park, the parking fee and so forth, may be displayed.

In FIG. 3 again, at the step S11, the user's desirable process, which is selected through the input device 19 by the user with reference to the menu screen at the step S10, is performed. For example, various processes such as a process of moving to the upper or lower hierarchy of the menu screen as described before, a process of drawing a map on the display device 20, a process of searching a route, a process of connecting to the internet and so on are performed as the occasion demand.

Then, at the step S12, it is judged whether the navigation which is currently being executed is to be ended or to be continued in accordance with the user's operation. As a result, if the navigation is to be continued (step S12: NO), the operation flow returns to the step S11. If the navigation is to be ended (step S12: YES), the processes in FIG. 2 are ended.

Figure 8:
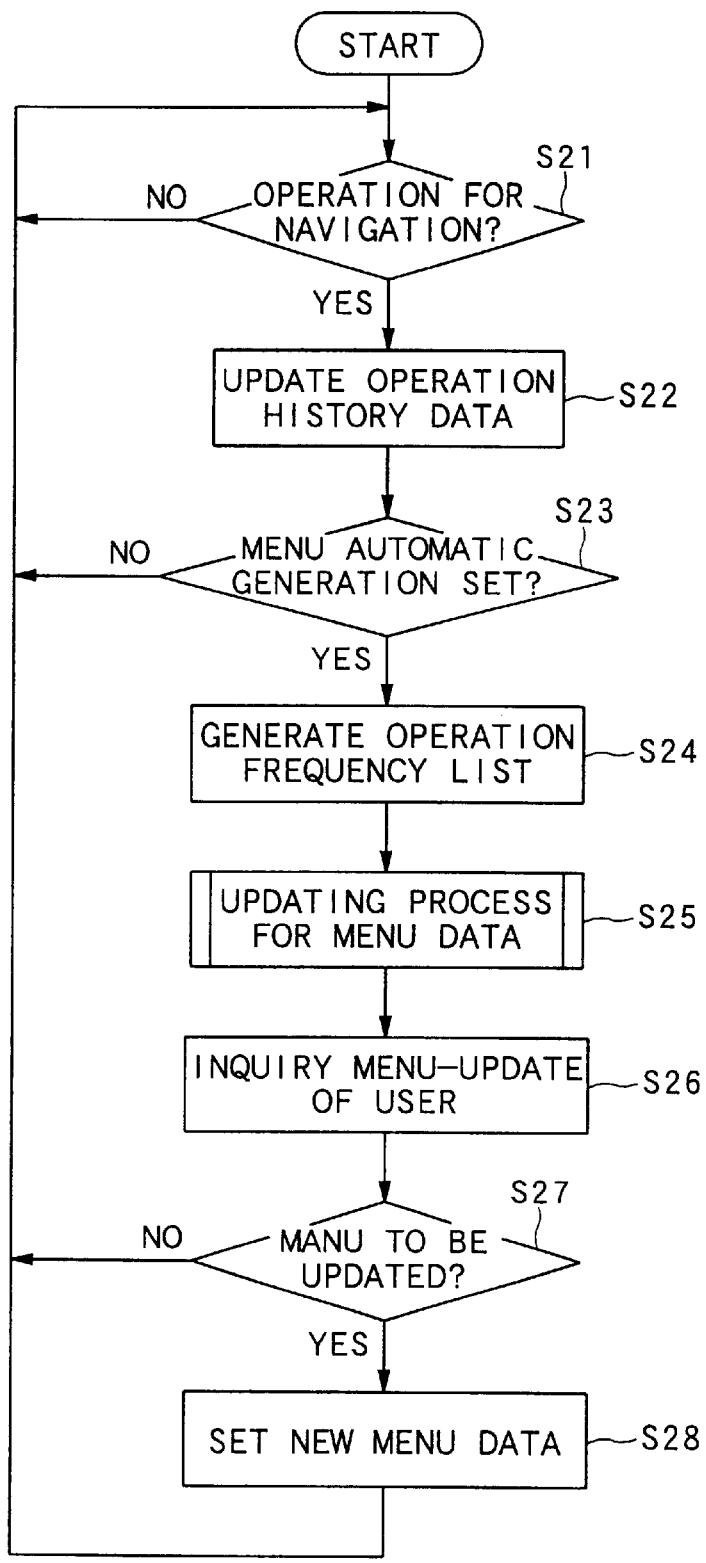
FIG. 8 is a flowchart showing a menu process after starting the navigation in the embodiment.

Next, FIG. 8 is a flowchart showing a menu process after the navigation is started. In the present embodiment, it is possible to automatically generate the desirable user menu data in the navigation system, in addition to or instead of reserving the desirable user menu data in the memory card 2 or the like, as mentioned above. Here, a case in which the user menu data is automatically generated on the basis of the operation history of the user is explained.

In FIG. 8, it is assumed that the navigation operation is already started. At this time, it is judged whether or not a predetermined operation for the navigation is performed by the input device 19. For example, it may be judged whether or not any kind of operation is selected in accordance with the menu selection screen of FIG. 4 or the respective menu screens shown in FIG. 5 to FIG. 7. As a result of the judgment at the step S21, if the predetermined operation for the navigation is performed (step S21: YES), the operation flow proceeds to a step S22. If the operation is not performed (step S21: NO), the monitoring is continued.

At the step S22, the operation history data in the hard disc 15 is updated in accordance with the operation result at the step S21. As the operation history data, the function (i.e., the operation command) selected on the menu screen by the user is sequentially recorded, and the operation command corresponding to the operation performed at the step S21 is newly added to the operation history data.

Then, at a step S23, it is judged whether or not the menu automatic generation is set. Namely, whether or not the menu automatic generation is to be performed is set to the predetermined flag in advance, and then, this flag is referred to at the step S23. For example, the menu automatic generation may be performed in case that the operation has been performed for a predetermined number of times since the menu automatic generation has been executed at a previous time. Alternatively, the menu automatic generation may be selectively started by the setting of the user.

As a result of the judgment at the step S23, if the menu automatic generation is set (step S23: YES), the operation flow proceeds to a step S24. If the menu automatic generation is not set (step S23: NO), the processes on and after the step S21 are repeated.

At the step S24, the operation frequency list is generated by accumulating and listing the number of times of the operations for each kind of operation command, on the basis of the operation history data updated at the step S22. This operation frequency list is reserved in a predetermined area of the hard disc 15, and is used to judge the correlation between the operation command and the number of times of the operation.

Then, at a step S25, the updating process is performed with respect to the menu data stored in the hard disc 15. Here, the updating process for the menu data at the step S25 is explained in detail with reference to FIG. 9.

Figure 9:
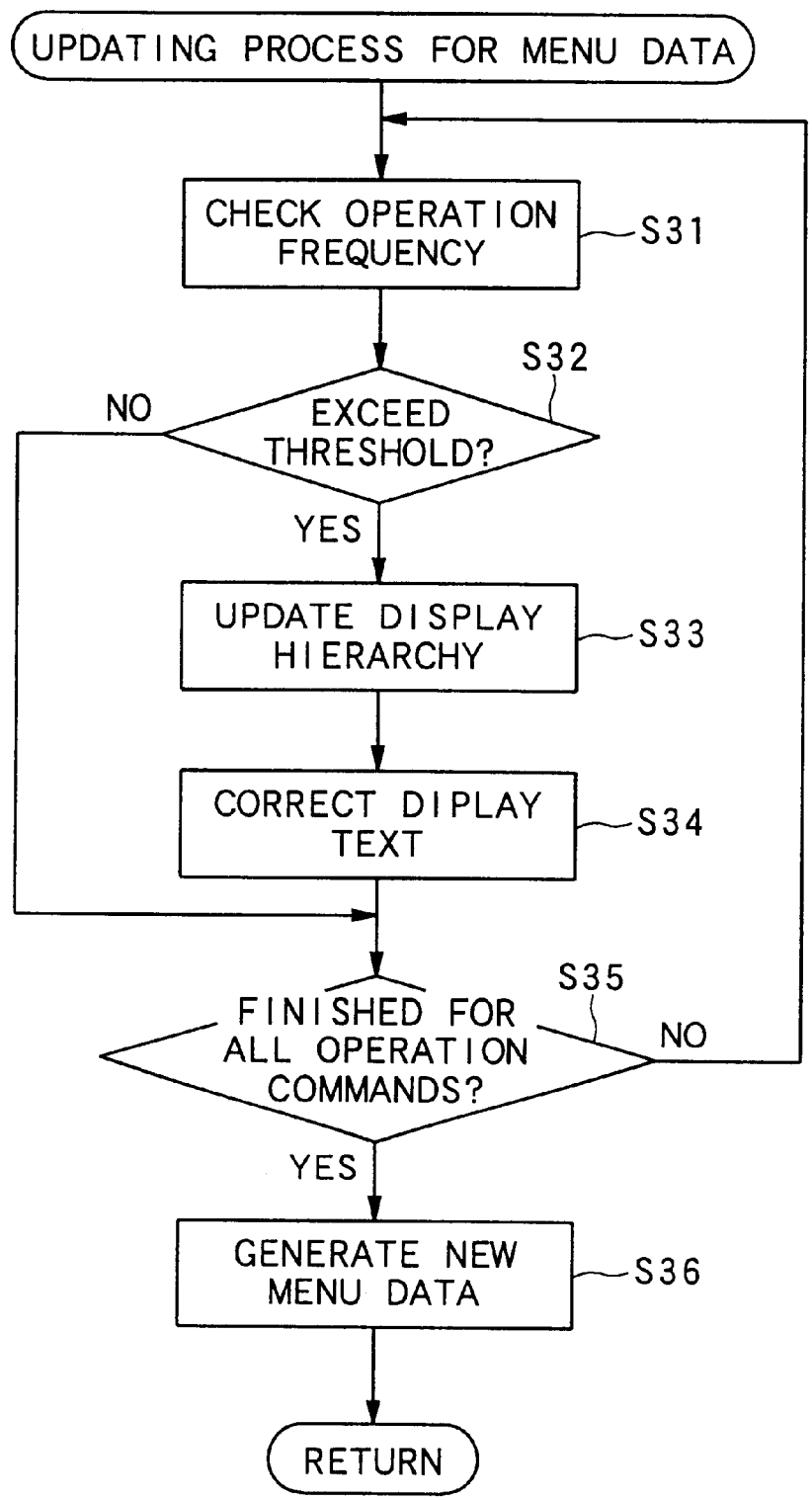
FIG. 9 is a flowchart showing an updating process for menu data in the embodiment.

As shown in FIG. 9, at a step S31, the operation frequency of the predetermined operation command included in the operation frequency list is checked. For this purpose, the above mentioned operation frequency list is referred to, and the number of times of the operation of the corresponding operation command is judged.

Then, at a step S32, it is judged whether or not the operation frequency as for the operation command exceeds a threshold value set in advance. More concretely, by setting a threshold value to 20 times for example, whether or not the number of times of the operation exceeds 20 times may be the judgment standard. As a result of the judgment at the step S32, if the operation frequency exceeds the threshold value (step S32: YES), the operation flow proceeds to a step S33. If the operation frequency does not exceed the threshold value (step S32: NO), the operational flow proceeds to a step S35.

The process at the steps S33 and S34 is an actual updating process corresponding to the type of the operation command. At first, at the step S33, the hierarchy of the operation command positioned at a specific hierarchy in the menu data is changed. Namely, the operation command, which is frequently used, may be raised to the one-higher hierarchy. On the other hand, the operation command, which is not frequently used, may be dropped to the one-lower hierarchy. In this manner, the hierarchy structure of the menu data is changed to the upper and the lower.

At the step S34, the display character string i.e., the displayed text, which corresponds to the operation command in the menu data, is corrected. This is the process in case that it is more appropriate to correct the text on the displayed screen as a result of the change of the hierarchy of the operation command at the step S33. Therefore, if the display character string in the different hierarchy is more appropriate, the process at the step S34 is omitted.

Next, at the step S35, it is judged whether or not the processes for all the operation commands included in the operation frequency list are finished. As a result, if the processes for all the commands are finished (step S35: YES), the operation flow proceeds to a step S36. If the processes for all the commands are not finished (step S35: NO), the operation flow turns to the step S31.

At the step S36, the new menu data, in which the respective corrected operation commands are unified in response to the processes at the steps S31 to S35, is generated. Then, when the step S35 is ended, the operation flow returns to the step S26 in FIG. 8.

Figure 10:
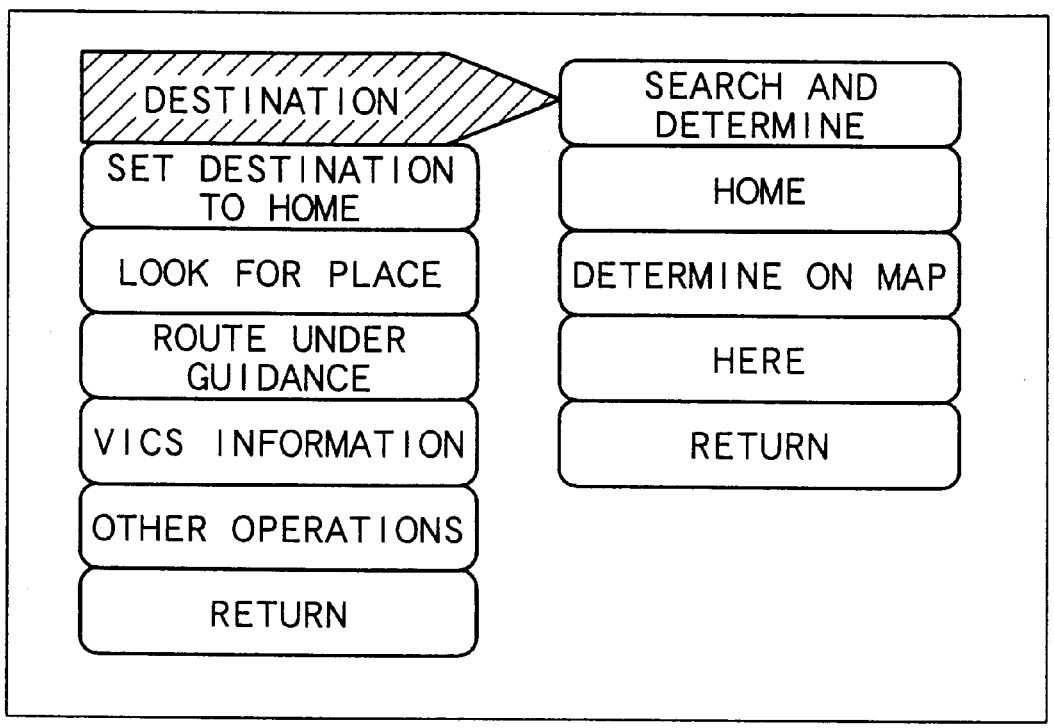
FIG. 10 is a plan view of an example of a menu screen in case that the updating process is applied to the default menu data.

Here, a concrete example of the updating process at the steps S33 and S34 is explained with reference to FIG. 10. FIG. 10 shows the example in case that the above mentioned updating process is applied with regard to the default menu data corresponding to the menu screen of FIG. 5. When comparing FIG. 10 with FIG. 5, "HOME" positioned at the lower hierarchy of "DESTINATION" in FIG. 5 is raised to one higher hierarchy in FIG. 10, and "SET DESTINATION TO HOME" and the display character string are corrected. Also, "INTERNET" in FIG. 5 is not displayed in FIG. 10, and is appended as one item (not illustrated in FIG. 10) of "OTHER OPERATIONS" at one lower hierarchy. Since the operation frequency of "HOME" in "DESTINATION" is the larger and the operation frequency of "INTERNET" is the smaller, the menu data corresponding to FIG. 10 is automatically generated.

Next, in FIG. 8 again, at the step S26, whether or not the menu updating is to be actually performed by the menu data, which is automatically generated, is inquired of the user by means of a predetermined message. Namely, in consideration with such a case that the user does not desire the usage of the automatically generated menu data, it is confirmed at the step S26.

Then, at a step S27, it is judged whether or not the user has selected to perform the menu updating in response to the inquiry at the step S26, on the basis of the predetermined operation of the input device. As a result of that, if the menu updating is to be performed (step S27: YES), the operation flow proceeds to a step S28. If the menu updating is not to be performed (step S27: NO), the operation flow returns to the step S21.

At the step S28, the setting is done such that the new menu data, which has been automatically updated, is used in the navigation operation from now on. Then, the new menu data is maintained in the hard disc 15 until the menu data is updated at the next occasion. When the process at the step S28 is ended, the operation flow returns to the step S21, and the same processes are repeated.

According to the navigation system of the present embodiment, when the menu display for the navigation is performed, the user can construct the user menu data in accordance with the XML format and then utilize it. Thus, it is possible to customize the menu display as the occasion demand. Further, since it is possible to automatically change the menu data with reflecting the user's operation history, it is possible to always perform the menu display suitable to the usage manner. In this manner, it is possible to realize the navigation which is highly operative and efficient for the user.

In addition, in the above embodiment, although the case in which the menu data corresponding to the XML format is used is explained, the present invention is not limited to this. It is possible to apply the present invention to various formats, each being adapted to perform the menu display.

Further, as the navigation system of the present embodiment, it is not limited to the individual navigation apparatus, but it is possible to realize the navigation system by combining the navigation apparatus with the personal computer. In this case, as the software to perform the transferring process of the present invention is executed in the personal computer, it is possible to realize the function of the above mentioned embodiment.

In the above described embodiment, the navigation system is equipped in a car. However, the present invention is not limited to this. For example, the navigation system of the present invention may be equipped in a movable body other than a car, or may be equipped in a portable electronic equipment such as a portable telephone, a mobile computer, a lap top computer or the like, which can be used for navigating a person who is walking. In other ward, the movable body as the target for the navigation operation may be a person using such a portable electronic equipment.

As mentioned above, according to the present embodiment, since the menu display of the navigation system is controlled by using the menu information, which can be updated, it is possible to realize the navigation convenient for the user by performing the menu display suitable for the user's usage manner.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No.2000-032696 filed on Feb. 3, 2000 including the specification, claims, drawings and summary is incorporated herein by reference in its entirety.

What is claimed is:

1. A navigation system comprising:
   a present position detecting device for detecting a present position;
   a navigation device for performing a navigation in correspondence with the detected present position on the basis of map data;
   a menu controlling device for controlling a menu display of the navigation by using menu information capable of being updated; and
   wherein the menu information is composed by a user.

2. A navigation system according to claim 1, wherein said menu controlling device controls the menu display of the navigation by using another menu information set and fixed in advance, in addition to the menu information capable of being updated.

3. A navigation system according to claim 2, wherein said navigation system further comprises a menu selection device adapted to select one of the menu information, which is set and fixed in advance, and the menu information capable of being updated, as the menu information to be used for the menu display.

4. A navigation system according to claim 3, wherein said menu selection device is adapted to select one of a plurality of menu information each capable of being updated, as the menu information to be used for the menu display.

5. A navigation system according to claim 1, wherein said navigation system further comprises a reading device, to which an external record medium recorded with the menu information capable of being updated is set, for reading the menu information from the external record medium.

6. A navigation system according to claim 1, wherein said navigation system further comprises a wireless communication device for receiving the menu information capable of being updated from an external portion.

7. A navigation system according to claim 6, wherein
   the menu information capable of being updated is reserved on an internet, and said wireless communication device receives the menu information capable of being updated by connecting to the internet.

8. A navigation system according to claim 1, wherein said navigation system further comprises an operation device adapted to issue an operation command of the navigation in accordance with the menu display.

9. A navigation system according to claim 8, wherein said navigation system further comprises an operation history memory for storing an operation history of said operation device, and said menu controlling device controls the menu display on the basis of the operation history.

10. A navigation system according to claim 9, wherein the menu information has such a data structure that the operation command is assigned to respective one of a plurality of hierarchies of the menu display, and said menu controlling device changes an hierarchy of the operation command on the basis of the operation history.

11. A navigation system according to claim 10, wherein said menu controlling device judges the number of times of operations for each operation command on the basis of the operation history, changes the operation command for which the number of times of the operation is larger to a higher hierarchy and changes the operation command for which the number of times of the operation is smaller to a lower hierarchy.

12. A navigation system according to claim 11, wherein said menu controlling device sets a display character string accompanying the menu display with respect to each operation command, and changes the display character string when changing the operation command to the higher or lower hierarchy.

13. A navigation system according to claim 1, wherein the menu information is described by a format corresponding to a hyper text.

14. A navigation system comprising:

a present position detecting device for detecting a present position;

a navigation device for performing a navigation in correspondence with the detected present position on the basis of map data;

a menu information memory for storing a plurality of menu information corresponding to a plurality of different menus;

a menu selection device adapted to select a desirable menu information from among the plurality of menu information;

a menu controlling device for controlling a menu display of the navigation by using the selected desirable menu information; and wherein the menu information is composed by a user.

15. A navigation system according to claim 14, wherein said menu selection device displays a menu selection screen including titles of the plurality of menu information stored in said menu information memory.

16. A navigation system according to claim 14, wherein the plurality of menu information include menu information capable of being updated.

17. A navigation system according to claim 16, wherein a layout of a menu in the menu information capable of being updated is capable of being updated.

18. A navigation system according to claim 16, wherein a character string of a menu in the menu information capable of being updated is capable of being updated.

19. A navigation system according to claim 14, wherein the plurality of menu information include menu information corresponding to a menu whose theme is a specific event.

20. A navigation system according to claim 19, wherein the menu whose theme is the specific event includes an item related to a facility of an event place.

21. A navigation system according to claim 1, wherein the menu information includes positional information for a facility.

22. A navigation system according to claim 21, wherein the navigation device sets a destination based on the positional information, and performs the navigation.

23. A navigation system comprising:

a present position detecting device for detecting a present position;

a navigation device for performing a navigation in correspondence with the detected present position on the basis of map data;

a menu controlling device for controlling a menu display of the navigation by using menu information capable of being updated; and wherein the menu controlling device updates the menu display based on an operational history by a user.

24. A navigation system comprising:

a present position detecting device for detecting a present position;

a navigation device for performing a navigation in correspondence with the detected present position on the basis of map data;

a menu information memory for storing a plurality of menu information corresponding to a plurality of different menus;

a menu selection device adapted to select a desirable menu information from among the plurality of menu information;

a menu controlling device for controlling a menu display of the navigation by using the selected desirable menu information; and wherein the menu controlling device updates the menu display based on an operational history by a user.

* * * * *